July 12, 1949.  F. E. RALPH  2,475,676
APPARATUS FOR THE RECOVERY OF COPPER
Original Filed Aug. 1, 1944  2 Sheets-Sheet 1
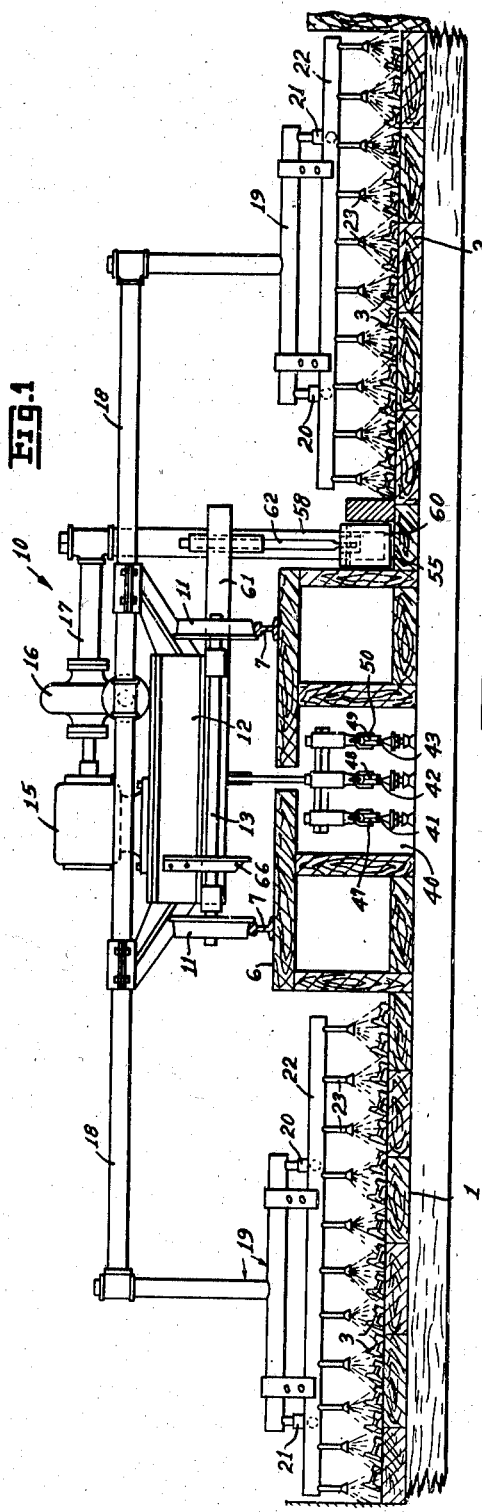
INVENTOR
Francis E. Ralph
BY
Pennie, Edmonds, Morton and Barrows
ATTORNEYS

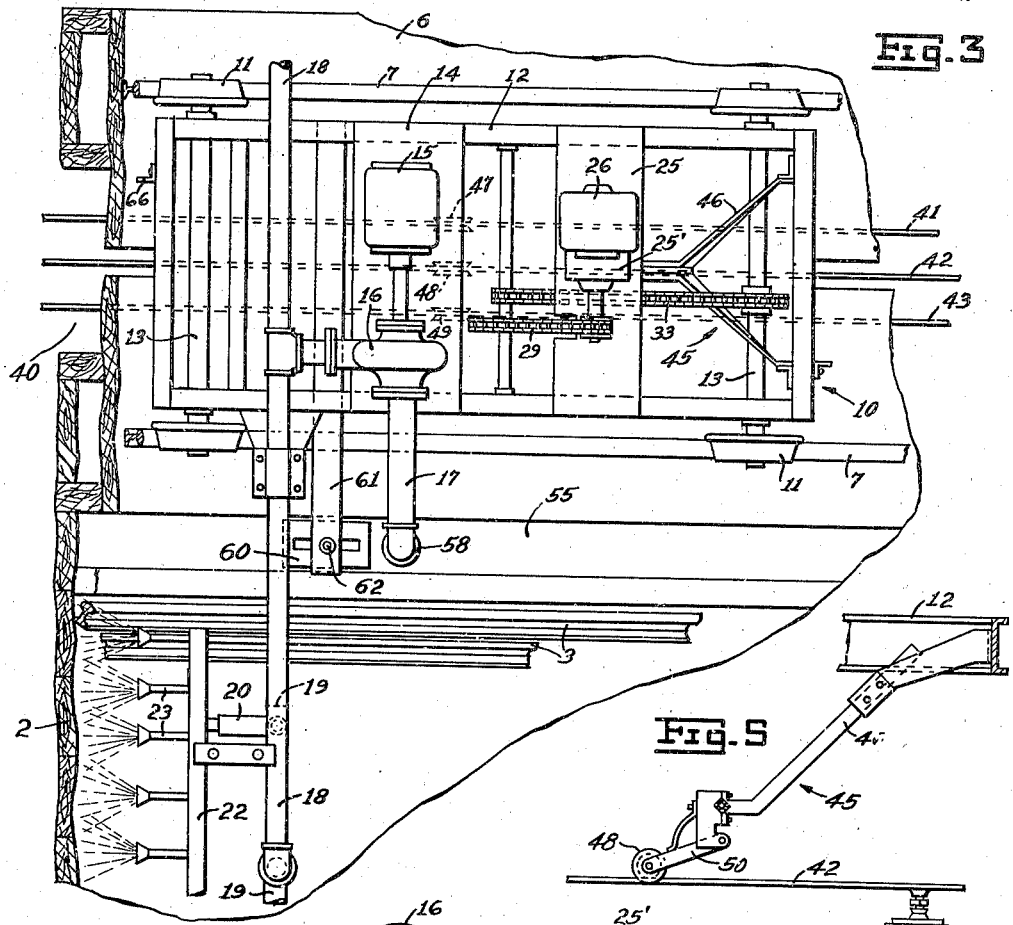

Patented July 12, 1949

2,475,676

UNITED STATES PATENT OFFICE 2,475,676

APPARATUS FOR THE RECOVERY OF COPPER

Francis E. Ralph, Butte, Mont., assignor to Anaconda Copper Mining Company, a corporation of Montana Original application August 1, 1944, Serial No. 547,576. Divided and this application August 6, 1946, Serial No. 688,633

7 Claims. (Cl. 266—22)

This invention relates to the recovery of copper from copper-bearing mine water and has for its object the provision of improved apparatus for recovering the copper precipitated from mine water on iron, usually in the form of scrap steel or iron. The invention is especially concerned with the removal of particles of copper from the surfaces of the iron and their recovery from the water in a simple and efficient operation. This application is a division of my copending application Serial No. 547,576, filed August 1, 1944, now abandoned.

It has been the practice heretofore to flow the copper-bearing mine water through long flumes or launders and in contact with scrap iron and steel placed in the launders. The iron replaces the copper in solution and the copper is deposited in fine granules on the surfaces of the iron. Scrap rails may be conveniently arranged in parallel rows on the bottom of the launder and they present a large surface to the water. Even when the scrap has such a favorable surface as steel rails, the removal of the copper has involved a laborious scrubbing of the surface with stiff brooms. The present invention eliminates this manual scrubbing operation and provides an improved means for the automatic removal of the precipitated copper involving the scrubbing of the surface of the iron with jets of water under high velocity. In accordance with the invention, a plurality of jets of water under a high velocity are directed against the iron in the launder in the direction of flow of water through the launder and in a progressive movement from one end of the launder to the other.

The invention provides a traveling slusher having means for directing a plurality of high-velocity jets of water against the iron and for automatically controlling the backward and forward travel of the slusher along the launder. In its more complete embodiment, the invention comprises an elongated launder system in which the copper-bearing mine water flows therethrough by gravity, with settling tanks at spaced intervals, a slusher traveling along, preferably over the launder, with means for automatically controlling the backward and forward travel of the slusher, and pump means for charging water under high velocity through a battery of nozzles against the iron in the launders. The copper is blasted off the surface of the iron and slushed along with the mine water progressively in the direction of the flow through the launders and into the settling tanks.

These and other novel features of the invention will be better understood after considering the following discussion taken in conjunction with the accompanying drawings, in which:

Fig. 1 is a front elevational view, partly in section, of apparatus embodying the invention;

Figs. 2 and 3 are fragmentary views from above of the apparatus shown in Fig. 1;

Fig. 4 is a side elevational view, partly in section, of the apparatus of Fig. 1, and Fig. 5 is a fragmentary enlarged view of the trolley apparatus.

The drawings illustrate launders 1 and 2 formed of planking and arranged alongside of each other in parallel rows, the bottoms of which are covered with any suitable form of iron-bearing material such as discarded steel rails 3. The launders are very long and slope downwardly so that the copper-bearing mine water will flow therethrough and over and around the rails on which the copper is precipitated. At suitable distances along the launders, for example, at intervals of 250 feet, settling tanks 5 are provided for catching and recovering the particles of copper. A platform 6 is constructed between the launders as a walkway and as a support for the steel rails 7 on which the slusher 10 travels back and forth along the rails on the wheels 11. The slusher comprises a structural frame 12 mounted on the axles 13 for the wheels 11. The frame carries the platform 14 on which is mounted a pumping unit comprising an electric motor 15, a centrifugal pump 16, a suction or intake conduit 17, and a discharge conduit 18 connecting to a header 19 on each side of the slusher. The headers 19 are connected by rubber hoses 20 and 21 to the nozzle manifolds 22 on which are mounted a plurality of nozzles 23 pointing downward and in the direction of the moving stream of mine water in the launders. The nozzles are constructed to direct flat sheets of high velocity of water into impinging contact with the iron rails lying on the bottoms of the launders.

The structural frame 12 carries a platform 25 on which is mounted a motorized speed reducer 25' for driving the slusher. In order to drive the slusher at a suitable reduced speed of about 25 feet per minute, the motor 26 drives the axle 27 through a speed reducing system comprising a sprocket 28, a chain 29, sprocket 30, shaft 31, sprocket 32, chain 33 and sprocket 34.

In a space 40 between the launders, and preferably beneath the platform 6, the electrical trolley wires 41, 42 and 43 of a three-phase, 250-volt circuit are arranged. The trolley apparatus 45, as best shown in Fig. 5, comprises a carrier arm 46 supported to the frame 12 and three trolley wheels 47, 48 and 49 which are pressed into contact with the trolley wires by the spring actuated arms 50. The electricity is carried up the arm 46 to the pump motor 16 and drive motor 26.

In order to provide a convenient source of water to be discharged out of the nozzles, a small trough 55 is constructed along one side of one of the launders and opening means (not shown) are provided at the head end of the launder for diverting a part of the mine water through the trough. The suction or intake conduit 17 for the pump dips into the water in the trough. Advantageously, this suction conduit comprises a lateral supporting pipe portion and a depending portion carrying the hose 58, the lower end of which is submerged into water. In order to aid in securing a suitable supply of water in the trough, a wooden float 60 is mounted in the trough and supported on the slusher by means of the arm 61 and adjustable depending rod 62. This wooden float serves as a dam near the intake of the hose 58, insuring a constant supply of mine water for the pump.

The slusher is constructed and arranged for automatic operation and when it reaches the end of its travel along the launders a reversing switch 65 of the customary type engages a trip 66 which operates the switch reversing the rotation of the motor 26 and the slusher travels in the opposite direction. When the slusher again reaches the end of its travel, it engages another reversing trip and is started back in the opposite direction.

During use of the new apparatus, copper-bearing mine water flowing under the action of gravity through the downwardly sloping launders deposits its copper in the form of fine granules on the surfaces of the iron rails.

The mine water pumped out of the trough 55 is charged against the surface of the rails in a plurality of jets to blast the particles of copper from the surface and carry them along in suspension in the mine water to the settling tanks wherein they are deposited and removed from time to time. A very effective scouring of the iron may be accomplished by charging the jets of water through the nozzles at a velocity of somewhere around 60 to 85 feet per second. This is most effectively done by using flattened nozzles of the type illustrated in the drawings which direct sheets of water into impinging contact with the rails. Such velocities may be accomplished by pumping the water through the nozzles under the pressure ranging from 25 to 50 pounds per square inch. The nozzles are positioned to direct the jets of water downwardly into impinging contact with the iron and in the direction of flow of mine water through the launders. The nozzles discharge the water in the same direction for both the upward and downward travel of the slusher and the jets of water aid in slushing the particles of copper along in the direction of flow to the settling tanks.

I claim:

1. Apparatus for recovering the copper precipitated on iron from copper-bearing mine water which comprises a long narrow downwardly sloping launder, said launder being adapted to contain the iron and to carry a flowing stream of mine water in contact therewith, a slusher arranged to travel along the launder, means for driving the slusher back and forth along the launder, a plurality of nozzles carried by the slusher, said nozzles being directed downwardly toward the iron and in the direction of flow of mine water through the launder, and means for directing jets of high velocity water through the nozzles and against the iron to dislodge the copper.

2. Apparatus for recovering the copper precipitated on iron from copper-bearing mine water which comprises a long narrow downwardly sloping launder, said launder being adapted to contain the iron and to carry a flowing stream of mine water in contact therewith, a slusher arranged to travel along the launder, means for driving the slusher back and forth along the launder, a plurality of nozzles carried by the slusher, said nozzles being directed downwardly toward the iron and in the direction of flow of mine water through the launder, pump means carried by the slusher for forcing jets of high velocity water through the nozzles and against the iron to dislodge the copper.

3. Apparatus for recovering the copper precipitated on iron from copper-bearing mine water which comprises a long narrow downwardly sloping launder, said launder being adapted to contain the iron and to carry a flowing stream of mine water in contact therewith, a slusher arranged to travel along the launder, means for driving the slusher back and forth along the launder, a plurality of nozzles carried by the slusher, said nozzles being directed downwardly toward the iron and in the direction of flow of mine water through the launder, pump means on the slusher, means for conveying mine water to the pump means, and means for directing mine water from the pump means through the nozzles and against the iron to dislodge the copper.

4. Apparatus for recovering the copper precipitated on iron from copper-bearing mine water which comprises at least one long narrow downwardly sloping launder, said launder being adapted to contain the iron and to carry a flowing stream of mine water in contact therewith, a settling tank adapted to receive mine water from the launder, rails forming a track along said launder, a slusher traveling on said rails, electric power means for driving the slusher along the rails, an electric circuit for supplying the power means, switch means for automatically reversing the direction of travel of the slusher at the ends of the launder, whereby the slusher continuously travels back and forth along the launder, pump means carried by the slusher, means for supplying the pump means with mine water, and a plurality of nozzles carried by the slusher and connected to the pump means for charging jets of high velocity mine water against the iron, said nozzles being directed downwardly against the iron and in the direction of the flow of mine water through the launder, whereby particles of dislodged copper are carried into the settling tank.

5. Apparatus for recovering copper precipitated on iron from copper-bearing water comprising a downwardly sloping launder, said launder being adapted to contain said iron and to carry a flowing stream of said copper-bearing water in contact therewith, and a slusher arranged to travel along said launder comprising a carriage, a pump mounted on the carriage, means for supplying water to the pump, nozzles supported from the carriage and directed toward the iron in the launder, said nozzles being directed downwardly and in the direction of flow of the copper-bearing water through the launder, and a conduit connecting the pump and nozzles, whereby water under pressure may be delivered by the pump to the nozzles and jets of high velocity water may be directed from the nozzles against the iron in the launder to dislodge precipitated copper particles therefrom.

6. Apparatus of the character described, comprising a downwardly sloping launder adapted to contain a load of iron and to carry a flowing stream of copper-bearing water in contact with said iron, a slusher arranged to travel along the launder, nozzles for directing jets of high velocity water against the iron in the launders, a pump mounted on the slusher for delivering water under pressure to the nozzles, and means for supplying water to the pump comprising a trough partitioned from the launder, a pump intake conduit extending into the trough, and a block supported in the trough from the carriage downstream with respect to the pump intake and serving to block the trough sufficiently to dam up a pool of water about the pump intake.

7. Apparatus of the character described, comprising a pair of parallel downwardly sloping launders each adapted to contain a load of iron and to carry a flowing stream of copper-bearing water in contact with said iron, a carriageway between the launders, a carriage arranged to travel on said carriage-way along the launders, a pump on the carriage, nozzles supported from each side of the carriage and directed both downstream and against the iron in each launder, and a conduit for conveying water under pressure from the pump to the nozzles, whereby jets of high velocity water may be directed against the iron in each launder to dislodge copper particles precipitated thereon.

FRANCIS E. RALPH.

REFERENCES CITED

The following references are of record in the file of this patent:

UNITED STATES PATENTS

| Number | Name | Date |
| --- | --- | --- |
| 1,007,439 | Flaccus | Oct. 31, 1911 |
| 1,456,464 | Rolland | May 22, 1923 |
| 1,720,332 | Kehoe | July 9, 1929 |
| 1,753,015 | McGregor | Apr. 1, 1930 |
| 2,023,841 | Kingsbury | Dec. 10, 1935 |
| 2,247,433 | Bolton | July 1, 1941 |
| 2,249,130 | Gunther | July 15, 1941 |

FOREIGN PATENTS

| Number | Country | Date |
| --- | --- | --- |
| 384,418 | Great Britain | Dec. 8, 1932 |